(12) United States Patent
Zhang et al.

(10) Patent No.: US 12,213,193 B2
(45) Date of Patent: *Jan. 28, 2025

(54) SPLIT BEARER CONTROL METHOD AND RELATED DEVICE

(71) Applicant: VIVO MOBILE COMMUNICATION CO., LTD., Guangdong (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 400 days.

This patent is subject to a terminal disclaimer.

(21) Appl. No.: 17/244,697

(22) Filed: Apr. 29, 2021

(65) Prior Publication Data

US 2021/0251031 A1 Aug. 12, 2021

Related U.S. Application Data

(63) Continuation of application No. PCT/CN2019/114661, filed on Oct. 31, 2019.

(30) Foreign Application Priority Data

Oct. 31, 2018 (CN) .......................... 201811288743.8

(51) Int. Cl.
*H04W 76/15* (2018.01)
*H04L 1/22* (2006.01)

(52) U.S. Cl.
CPC .............. *H04W 76/15* (2018.02); *H04L 1/22* (2013.01)

(58) Field of Classification Search
CPC ........ H04W 76/12; H04W 76/15; H04L 1/08; H04L 1/22; H04L 5/0094
See application file for complete search history.

(56) References Cited

U.S. PATENT DOCUMENTS

2015/0245349 A1 8/2015 Jha et al.
2017/0238349 A1 8/2017 Uchino et al.
(Continued)

FOREIGN PATENT DOCUMENTS

CN 106105304 A 11/2016
CN 106717094 A 5/2017
(Continued)

OTHER PUBLICATIONS

JP Office Action in application No. 2021-523626 dated Jun. 7, 2022.
(Continued)

*Primary Examiner* — Gary Mui
(74) *Attorney, Agent, or Firm* — BROOKS KUSHMAN P.C.

(57) ABSTRACT

A split bearer control method and a related device are provided. The split bearer control method applied to a terminal includes: a target split bearer is configured for the terminal, a data duplication function is configured for the target split bearer, the target split bearer includes N transmission paths, and N is a positive integer greater than 2; the terminal receives split bearer indication signaling sent by a network-side device; and the terminal activates or deactivates the data duplication function in response to the split bearer indication signaling.

14 Claims, 8 Drawing Sheets

(56) References Cited

U.S. PATENT DOCUMENTS

| | | | |
|---|---|---|---|
| 2018/0279262 A1* | 9/2018 | Babaei | H04L 1/1848 |
| 2018/0310202 A1 | 10/2018 | Lohr et al. | |
| 2019/0069308 A1* | 2/2019 | Lee | H04W 28/085 |
| 2019/0104560 A1* | 4/2019 | Nuggehalli | H04L 69/14 |
| 2019/0253926 A1* | 8/2019 | Kim | H04W 28/0278 |
| 2019/0289489 A1* | 9/2019 | Yi | H04W 28/0205 |
| 2019/0394796 A1* | 12/2019 | Wei | H04W 28/04 |
| 2020/0029379 A1 | 1/2020 | Xiao et al. | |
| 2020/0145171 A1 | 5/2020 | Jiang | |
| 2020/0178327 A1 | 6/2020 | Jiang | |
| 2020/0275310 A1* | 8/2020 | Tang | H04W 28/0252 |
| 2021/0126746 A1* | 4/2021 | Li | H04L 5/0055 |
| 2021/0144583 A1* | 5/2021 | Xiao | H04W 28/04 |
| 2021/0152296 A1 | 5/2021 | Chen | |
| 2021/0243764 A1* | 8/2021 | Wu | H04W 76/15 |
| 2021/0250139 A1* | 8/2021 | Zhang | H04L 5/0091 |
| 2021/0250789 A1* | 8/2021 | Wu | H04W 76/12 |
| 2021/0297899 A1 | 9/2021 | Baek et al. | |

FOREIGN PATENT DOCUMENTS

| | | |
|---|---|---|
| CN | 107342851 A | 11/2017 |
| CN | 108370304 A | 8/2018 |
| CN | 108401530 A | 8/2018 |
| CN | 108616958 A | 10/2018 |
| EP | 3 346 764 A | 7/2018 |
| JP | 2021533614 A | 12/2021 |
| KR | 10-2018-0108391 A | 10/2018 |
| WO | 2012019460 A1 | 2/2012 |
| WO | 2017/182927 A1 | 10/2017 |
| WO | 2018/143600 A1 | 8/2018 |
| WO | 2018/167358 A1 | 9/2018 |
| WO | 2018/170891 A1 | 9/2018 |
| WO | 2018/176039 A1 | 9/2018 |
| WO | 2018171512 A1 | 9/2018 |
| WO | 2020027599 A1 | 2/2020 |

OTHER PUBLICATIONS

KR Office Action dated Feb. 24, 2023 as received in Application No. 10-2021-7016451.

Singapore Office Action issued in corresponding application No. 11202104445T, dated Oct. 11, 2022.

EP Search Report in Application No. 19879476.0 dated Nov. 29, 2021.

"PDCP duplication with multiple RLC entitties" 3GPP TSG-RAN WG2 Meeting #107bis, R2-1912719, Intel Corporation, Oct. 14, 2019.

"PDCP Duplication with More than 2 Copies" 3GPP TSG-RAN WG3 #101bis, R3-185555, CATT, Oct. 8, 2018.

"3rd Generation Partnership Project; Technical Specification Group Radio Access Network Evolved Universal Terrestrial Radio Access (E-UTRA); Medium Access Control (MAC) protocol specification (Release 15)" 3GPP TS 36.321 V15.3.0 (Sep. 2018).

"3rd Generation Partnership Project; Technical Specification Group Radio Access Network; NR; NR and NG-RAN Overall Description; Stage 2 (Release 15)" 3GPP TS 38.300 V15.3.1, (Oct. 2018).

"3rd Generation Partnership Project; Technical Specification Group Radio Access Network; NR; Medium Access Control (MAC) protocol specification (Release 15)" 3GPP TS 38.321 V15.3.0 (Sep. 2018).

"3rd Generation Partnership Project; Technical Specification Group Radio Access Network; NR; Packet Data Convergence Protocol (PDCP) specification (Release 15)" 3GGPP TS 38.323 V15.3.0 (Sep. 2018).

CN Office Action in Application No. 201811288743.8 dated May 8, 2021.

"Threshold for UL split with pre-processing" GPP TSG-RAN WG2 Meeting NR AH#2, LG Electronics Inc., R2-1709656, Jun. 27, 2017.

"Discussion on support for PDCP Duplication with More than 2 Copies" 3GPP TSG-RAN WG3 #101bis, Ericsson, R3-185879, Oct. 8, 2018.

Written Opinion and International Search Report in Application No. PCT/CN2019/114661 dated May 14, 2021.

\* cited by examiner

SPLIT BEARER CONTROL METHOD AND RELATED DEVICE

CROSS-REFERENCE TO RELATED APPLICATIONS

This application is continuation application of PCT International Application No. PCT/CN2019/114661 filed on Oct. 31, 2019, which claims priority to Chinese Patent Application No. 201811288743.8 filed in China on Oct. 31, 2018, the disclosures of which are incorporated in their entireties by reference herein.

TECHNICAL FIELD

This disclosure relates to the field of communications technologies, and in particular, to a split bearer control method and a related device.

BACKGROUND

With development of mobile communications technologies, a mobile communications system such as a 5th Generation (5G) system uses a dual connectivity (DC) architecture for data transmission. In the DC architecture, a master cell group (MCG) of a terminal (User Equipment, UE) uses resources of a master node (MN) on a network side, and a secondary cell group (SCG) of the terminal uses resources of a secondary node (SN) on the network side.

In the DC architecture, the network side can configure a radio bearer (RB) of the terminal as a split bearer that includes two transmission paths. Different transmission paths are associated with different radio link control (RLC) entities, and different RLC entities belong to different cell groups.

For example, as shown in FIG. 1, target split bearer 1 and split bearer 2 are configured for the terminal, where a packet data convergence protocol (PDCP) 1 entity of the split bearer 1 is in the MCG, but an RLC 1 entity and an RLC 3 entity are respectively in the MCG and SCG, and a transmission path is formed between the PDCP 1 entity, the RLC 1 entity, and a media access control (MAC) 1 entity, so that the terminal can use resources of the MN by using the transmission path. In addition, another transmission path is formed between the PDCP 1 entity, and an RLC 3 entity and a MAC 2 entity in the SCG, and the terminal uses resources of the SN by using the transmission path.

In addition, the network side can further configure a data duplication function for the RB of the terminal, so that a PDCP layer of the terminal duplicates data when delivering the data to a lower layer. In a case in which the duplication function is activated, the terminal can send a plurality of copies of data (including original data and duplicated data) through different transmission paths of the split bearer, to improve reliability of data corresponding to the split bearer.

However, currently, for an RB configured with a data duplication function and as a split bearer, the network-side device configures only two transmission paths for a PDCP entity corresponding to the RB. When there is a high requirement on reliability of data corresponding to a radio bearer, configuring only two transmission paths may not be able to satisfy the reliability requirement.

SUMMARY

Some embodiments of this disclosure provide a split bearer control method and a related device, to resolve a problem that when there is a high requirement on reliability of data corresponding to a radio bearer currently, configuring only two transmission paths may not satisfy the reliability requirement.

To resolve the foregoing problem, this disclosure is implemented as follows:

According to a first aspect, some embodiments of this disclosure provide a split bearer control method, applied to a terminal, where a target split bearer is configured for the terminal, a data duplication function is configured for the target split bearer, the target split bearer includes N transmission paths, and N is a positive integer greater than 2; and the method includes:
  receiving split bearer indication signaling sent by a network-side device; and
  activating or deactivating the data duplication function in response to the split bearer indication signaling.

According to a second aspect, this disclosure some embodiments of this disclosure further provide a split bearer control method, applied to a network-side device and including:
  sending split bearer indication signaling to a terminal, where the split bearer indication signaling is used to instruct the terminal to activate or deactivate a data duplication function in response to the split bearer indication signaling, where
  a target split bearer is configured for the terminal, the data duplication function is configured for the target split bearer, and the target split bearer includes N transmission paths.

According to a third aspect, some embodiments of this disclosure further provide a terminal, where a target split bearer is configured for the terminal, a data duplication function is configured for the target split bearer, the target split bearer includes N transmission paths, and N is a positive integer greater than 2; and the terminal includes:
  a receiving module, configured to receive split bearer indication signaling sent by a network-side device; and
  a control module, configured to activate or deactivate the data duplication function in response to the split bearer indication signaling.

According to a fourth aspect, some embodiments of this disclosure further provide a network-side device, including:
  a sending module, configured to send split bearer indication signaling to a terminal, where the split bearer indication signaling is used to instruct the terminal to activate or deactivate a data duplication function in response to the split bearer indication signaling, where
  a target split bearer is configured for the terminal, the data duplication function is configured for the target split bearer, and the target split bearer includes N transmission paths.

According to a fifth aspect, some embodiments of this disclosure further provide a terminal, where the terminal includes a processor, a memory, and a computer program stored in the memory and capable of running on the processor, where when the computer program is executed by the processor, the steps of the split bearer control method according to the first aspect are implemented.

According to a sixth aspect, some embodiments of this disclosure further provide a network-side device, where the network-side device includes a processor, a memory, and a computer program stored in the memory and capable of running on the processor, where when the computer program is executed by the processor, the step of the split bearer control method according to the second aspect is implemented.

According to a seventh aspect, some embodiments of this disclosure further provide a computer-readable storage medium, where the computer-readable storage medium stores a computer program, and when the computer program is executed by a processor, the steps of the split bearer control method according to the first aspect or the second aspect are implemented.

In some embodiments of this disclosure, the target split bearer is configured for the terminal, the data duplication function is configured for the target split bearer, the target split bearer includes the N transmission paths, and N is a positive integer greater than 2; the terminal receives the split bearer indication signaling sent by the network-side device; and the terminal activates or deactivates the data duplication function in response to the split bearer indication signaling. Because the N transmission paths may be configured for the split bearer of the terminal, a quantity of transmission paths of the split bearer increases, and reliability of the terminal is improved. In addition, the terminal can activate or deactivate the data duplication function of the target split bearer in time in response to the split bearer indication signaling, so that resource utilization of the terminal is improved.

BRIEF DESCRIPTION OF DRAWINGS

To describe the technical solutions in some embodiments of this disclosure more clearly, the following briefly describes the accompanying drawings required for describing some embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes the technical solutions in some embodiments of this disclosure with reference to the accompanying drawings in some embodiments of this disclosure. Apparently, the described embodiments are some but not all of the embodiments of this disclosure. All other embodiments that a person of ordinary skill in the art obtains without creative efforts based on the embodiments of this disclosure shall fall within the protection scope of this disclosure.

The terms "first", "second", and the like in this application are used to distinguish between similar objects instead of describing a specific order or sequence. In addition, the terms "including", "having", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C.

Figure 1:
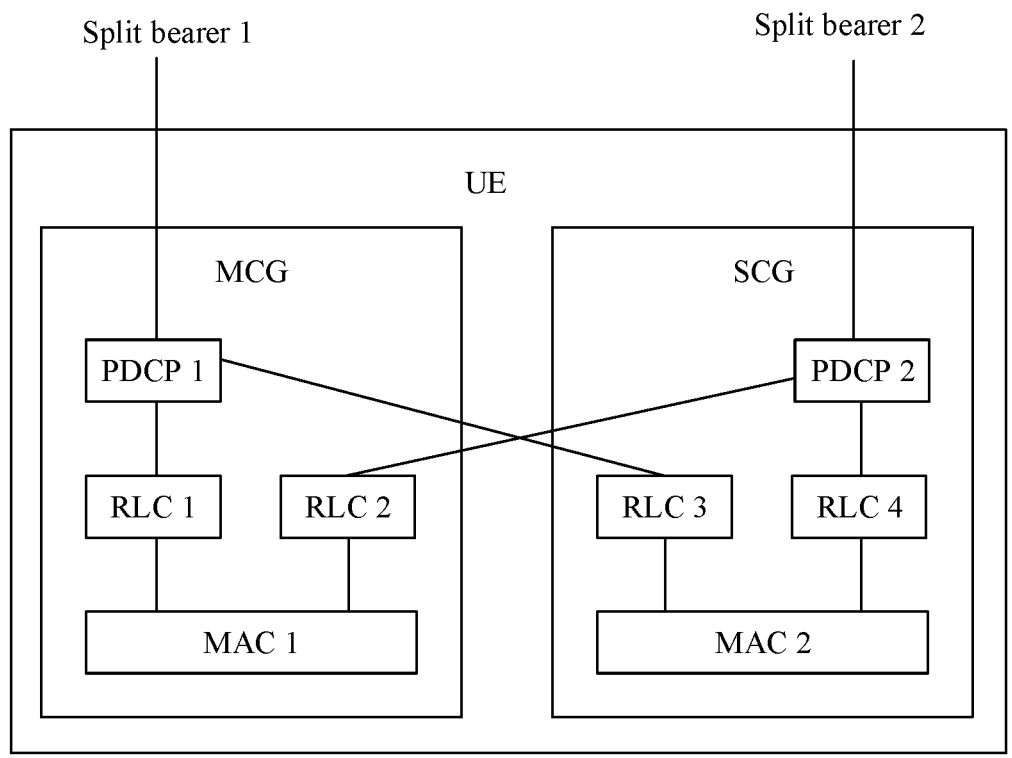
FIG. 1 is a schematic structural diagram of a radio bearer configured as a split bearer for a terminal in the related art.
Figure 2:
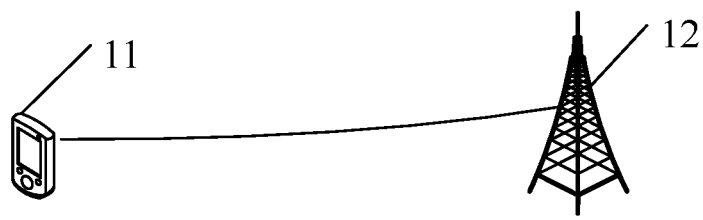
FIG. 2 is a structural diagram of a network system to which some embodiments of this disclosure may be applied.

FIG. 2 is a structural diagram of a network system to which some embodiments of this disclosure may be applied. As shown in FIG. 2, the network system includes a terminal 11 and a network-side device 12, and communication can be performed between the terminal 11 and the network-side device 12 by using a network.

In some embodiments of this disclosure, the terminal 11 may also be referred to as user equipment (UE). In specific implementation, the terminal 11 may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal 11 is not limited in some embodiments of this disclosure.

It should be noted that at least one radio bearer (RB) in the terminal in some embodiments of this disclosure is configured as a split bearer by the network-side device, and the split bearer includes N transmission paths, where N is a positive integer greater than 2.

Figure 3:
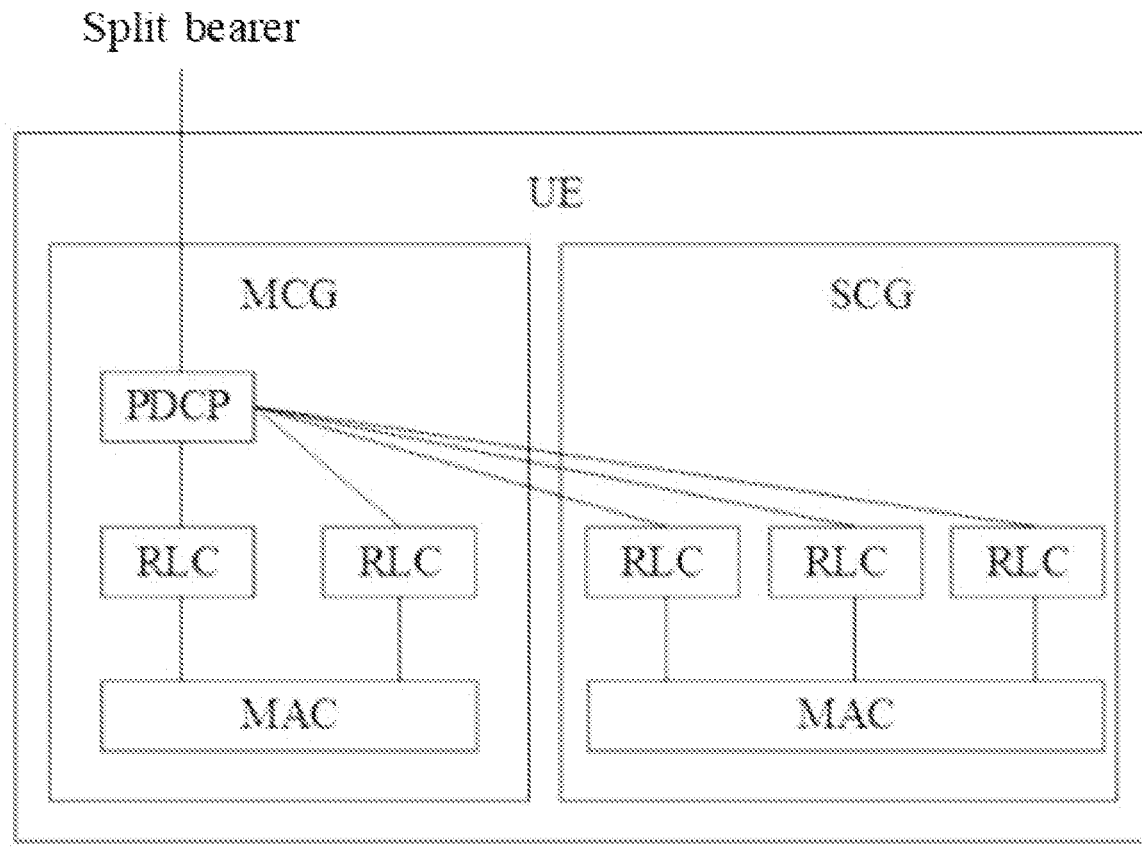
FIG. 3 is a schematic structural diagram of a split bearer for a terminal according to some embodiments of this disclosure.

For example, as shown in FIG. 3, an RB of the terminal is configured as a split bearer with five transmission paths, and a packet data convergence protocol (PDCP) entity of the RB is in an MCG; five radio link control (RLC) entities associated with the five transmission paths are in the master cell group (MCG) and a secondary cell group (SCG) respectively, that is, two RLC entities are in the MCG, and the other three RLC entities are in the SCG, so that the terminal can use resources of a master node (MN) on a network side by using a transmission path corresponding to an RLC entity in the MCG and use resources of a secondary node (SN) by using a transmission path corresponding to an RLC entity in the SCG.

In addition, in some embodiments of this disclosure, a data duplication function is further configured for the split bearer, and in a case in which the data duplication function of the split bearer is activated, that is, in a data duplication function operation mode, the terminal can transmit a plurality of copies of data simultaneously by using the transmission paths of the split bearer, thereby improving reliability of data corresponding to the split bearer.

For example, in the split bearer shown in FIG. 3, the terminal can transmit five copies of data (including one copy of original data and four copies of duplicated data) by using the five transmission paths respectively.

In a case in which the data duplication function of the split bearer is deactivated, the split bearer falls back to a split bearer operation mode. In the split bearer operation mode, the terminal can use one corresponding transmission path for uplink data transmission.

The network-side device 12 may be a base station, a relay, an access point, or the like. The base station may be a base station of 5G or a later version (for example, a 5G NR NB), or a base station in another communications system (for example, an evolved NodeB (eNB)). It should be noted that in some embodiments of this disclosure, a specific type of the network-side device 12 is not limited.

Figure 4:
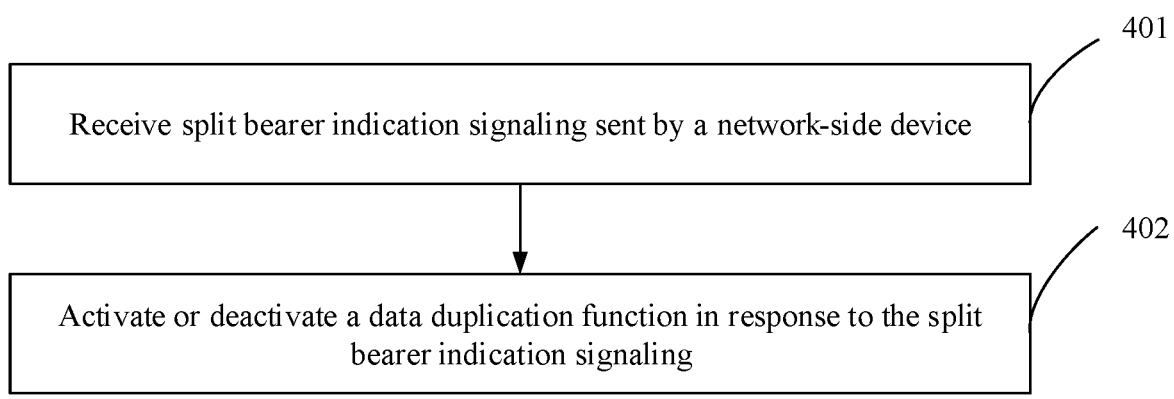
FIG. 4 is a flowchart 1 of a split bearer control method according to some embodiments of this disclosure.

FIG. 4 is a flowchart 1 of a split bearer control method according to some embodiments of this disclosure. The split bearer control method in this embodiment is applied to a terminal. A target split bearer is configured for the terminal, a data duplication function is configured for the target split bearer, the target split bearer includes N transmission paths, and N is a positive integer greater than 2. The method includes the following steps.

Step 401: Receive split bearer indication signaling sent by a network-side device.

Step 402: Activate or deactivate the data duplication function in response to the split bearer indication signaling.

Herein, because the N transmission paths may be configured for the split bearer of the terminal, a quantity of transmission paths of the split bearer increases and reliability of the terminal is improved. In addition, the terminal can activate or deactivate the data duplication function of the target split bearer in time in response to the split bearer indication signaling, that is, switching of the target split bearer between a data duplication function operation mode and a split bearer operation mode is implemented in time, so that resource utilization of the terminal is improved.

Target split bearers may be configured for a plurality of RBs in the foregoing terminal, and the foregoing target split bearer is a split bearer configured for at least one RB. This is not limited herein.

In some embodiments of this disclosure, in a case in which the target split bearer is configured for the terminal, and the data duplication function is configured for the target split bearer, and the target split bearer includes the N transmission paths, configuration information of the target split bearer is configured in the terminal, where the configuration information may be sent by the network-side device to the terminal, and the configuration information may include at least one of the following:

a split bearer identifier;
configuration information of N radio link control (RLC) entities associated with the split bearer, where the N RLC entities belong to different cell groups, for example, belong to a master cell group (MCG) and a secondary cell group (SCG) respectively;
at least one split bearer threshold; or,
association relationships between split bearer thresholds and transmission paths, where the association relationships between the split bearer thresholds and transmission paths may include the following information:
each split bearer threshold corresponds to one or more transmission paths, and a quantity of transmission paths corresponding to each split bearer threshold is less than N.

In addition, because each of the N transmission paths is different, each transmission path can be identified by using identification information, so that each transmission path is unique. In this way, the N transmission paths are distinguished from each other. For example, in the association relationships between the split bearer thresholds and the transmission paths, mappings between the split bearer thresholds and identification information of the transmission paths may be established.

Specifically, the identification information may include a cell group identifier (Cell Group ID) and a logical channel identity (LCID).

In some embodiments of this disclosure, in the foregoing step 401, when the network-side device needs to activate or deactivate the data duplication function of the target split bearer, the network-side device sends the split bearer indication signaling to the terminal, and the terminal receives the split bearer indication signaling.

The split bearer indication signaling may be any signaling that can enable the terminal to activate or deactivate the data duplication function of the target split bearer in response to the split bearer indication signaling. The split bearer indication signaling may be at least one of radio resource control (RRC) signaling, MAC control element (CE) signaling, or PDCP signaling, or the like.

Specifically, the split bearer indication signaling may be implemented in at least one of the following manners 1 to 5:

Manner 1: Radio resource control (RRC) signaling, where the RRC signaling is used to instruct the terminal to activate or deactivate the data duplication function of the target split bearer.

Specifically, when the RRC signaling is used to instruct to activate or deactivate the data duplication function, the RRC signaling may use one bit to instruct to activate or deactivate the data duplication function. Further, the bit in the RRC signaling may be carried in a PDCP-configuration IE (PDCP-configuration information element).

For example, when a value of the bit in the RRC signaling is "1", the RRC signaling is used to instruct to activate the data duplication function of the split bearer; or when a value of the bit in the RRC signaling is "0", the RRC signaling is used to instruct to deactivate the data duplication function of the split bearer.

Manner 2: First MAC control element (CE) signaling, where the first MAC CE signaling is used to instruct the terminal to activate or deactivate the data duplication function of the target split bearer.

Herein, the first MAC CE signaling can activate or deactivate the data duplication function based on a bearer granularity.

In specific implementation, the first MAC CE signaling may include a first indicator field, used to indicate a status of the data duplication function.

For example, if a value of the indicator field (for example, a D2 field) of the first MAC CE signaling is "1", and a radio bearer whose sequence number is 2 is a split bearer, the first MAC CE signaling may be used to instruct to activate a data duplication function of the radio bearer whose sequence number is 2; or if a value of the indicator field of the first MAC CE signaling is "0", the first MAC CE signaling is used to instruct to deactivate a data duplication function of the radio bearer whose sequence number is 2.

Manner 3: Second MAC CE signaling that carries first indication information, where the first indication information is used to indicate activation or deactivation of the N transmission paths; and after the terminal executes the first indication information, if all the N transmission paths are deactivated (that is, none of the N transmission paths is activated) or only one of the N transmission paths is activated, the terminal deactivates the data duplication function.

Herein, the second MAC CE signaling can activate or deactivate a transmission path of the target split bearer based on a transmission path granularity (that is, MAC CE per leg).

In specific implementation, the second MAC CE signaling may include a cell group identifier and a logical channel identity, or the second MAC CE signaling may include a first field used to identify the target split bearer, and a second field used to indicate a status of a transmission path whose sequence number is i in the target split bearer, where i is an integer greater than or equal to 0 and less than or equal to N.

Scenario 1: The second MAC CE signaling includes the cell group identifier and the logical channel identity.

In this implementation, the second MAC CE signaling may include a third field used to identify a transmission path of the target split bearer. Because the cell group identifier and the logical channel identity may be used to uniquely identify one transmission path, in an implementation, the second MAC CE signaling may include the cell group identifier and the logical channel identity. However, it should be understood that in other implementations, the second MAC CE signaling may include other identifiers that may be used to identify the transmission path of the target split bearer. This is not limited in some embodiments of this disclosure.

In specific implementation, the second MAC CE signaling can activate or deactivate the transmission path identified by the cell group identifier and the logical channel identity. For example, assuming that the target split bearer includes a transmission path 1, a transmission path 2, and a transmission path 3, if the cell group identifier and the logical channel identity can identify the transmission path 2, the second MAC CE signaling may be used to instruct to activate the transmission path 2.

Scenario 2: The second MAC CE signaling includes the first field used to identify the target split bearer, and the second field used to indicate the state of the transmission path whose sequence number is i in the target split bearer.

In this scenario, the terminal may determine, based on the first field and the second field, the state of the transmission path whose sequence number is i in the target split bearer.

In specific implementation, if the first field identifies the target split bearer, and a value of the second field is "1", it may indicate that the transmission path whose sequence number is i in the target split bearer is an activated state; or if the first field identifies the target split bearer, and a value of the second field is "0", it may indicate that the transmission path whose sequence number is i in the target split bearer is a deactivated state.

It should be noted that in some embodiments of this disclosure, the second MAC CE signaling corresponds to a MAC entity. In specific implementation, the second MAC CE signaling may be used to instruct to activate or deactivate a transmission path of a split bearer associated with a MAC entity corresponding to the second MAC CE signaling.

Manner 4: Third MAC CE signaling that carries second indication information, where the second indication information is used to instruct the terminal to activate or deactivate the data duplication function of the target split bearer.

In this implementation, the third MAC CE may include a split bearer indicator field, used to instruct the terminal to activate or deactivate the data duplication function of the target split bearer.

In specific implementation, if a value of the split bearer indicator field is "0", the split bearer indicator field is used to instruct the terminal to activate the data duplication function; or if a value of the split bearer indicator field is "1", the split bearer indicator field is used to instruct the terminal to deactivate the data duplication function and fall back to the split bearer operation mode.

In the manner 4, in a case in which the terminal deactivates the data duplication function, the second indication information may be further used to instruct the terminal to change an available transmission path among the N transmission paths.

In specific implementation, for example, in the foregoing manner 3, the third MAC CE signaling may also include the cell group identifier and the logical channel identity, or the third MAC CE signaling may also include the first field used to identify the target split bearer, and the second field used to indicate the state of the transmission path whose sequence number is i in the target split bearer, where i is an integer greater than or equal to 0 and less than or equal to N. Certainly, it can also be understood that the third MAC CE signaling is actually the second MAC CE signaling that further includes the foregoing split bearer indicator field. Details are not described again herein.

To facilitate understanding of the third MAC CE signaling, the following describes in detail the third MAC CE signaling by using an example in combination with content of the manner 3 and the manner 4.

In an actual application, the second MAC CE signaling may include a MAC CE subheader and a MAC CE. For a format of the MAC CE subheader, refer to FIG. 5. For the MAC CE, refer to FIG. 6a, FIG. 6b, and FIG. 6c. It should be noted that the third MAC CE signaling corresponding to FIG. 6a is the third MAC CE signaling including the cell group identifier and the logical channel identity; and the third MAC CE signaling corresponding to FIG. 6b and FIG. 6c is the third MAC CE signaling including the first field and the second field.

Figure 5:
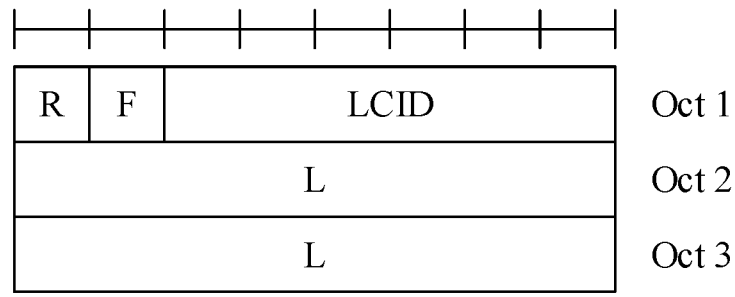
FIG. 5 is a schematic diagram of a MAC CE subheader according to some embodiments of this disclosure.
Figure 6A:
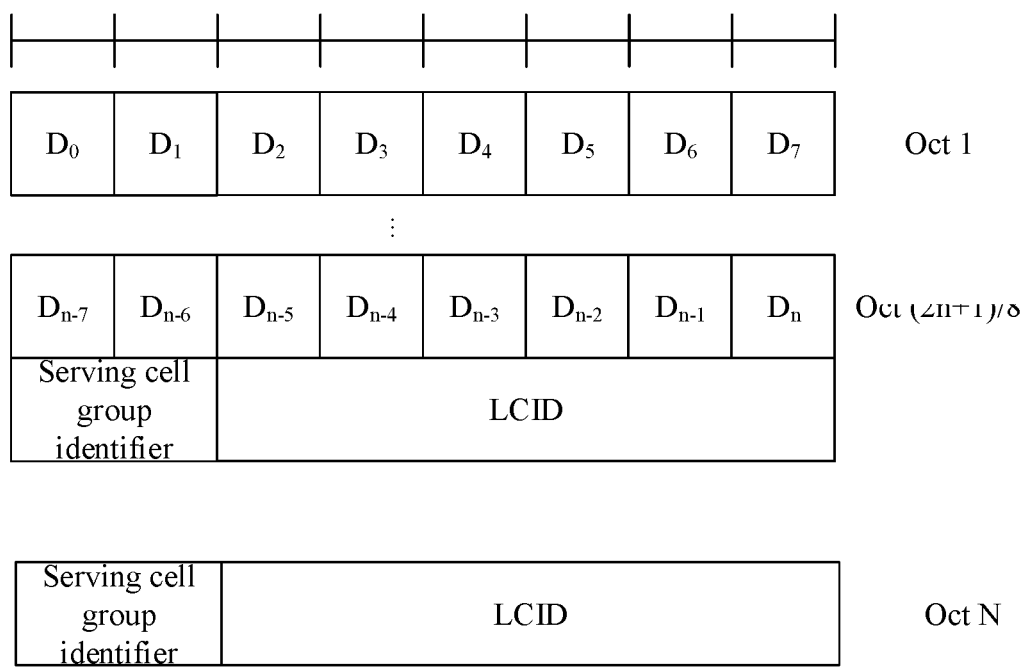
FIG. 6a is a schematic diagram 1 of a MAC CE according to some embodiments of this disclosure.
Figure 6B:
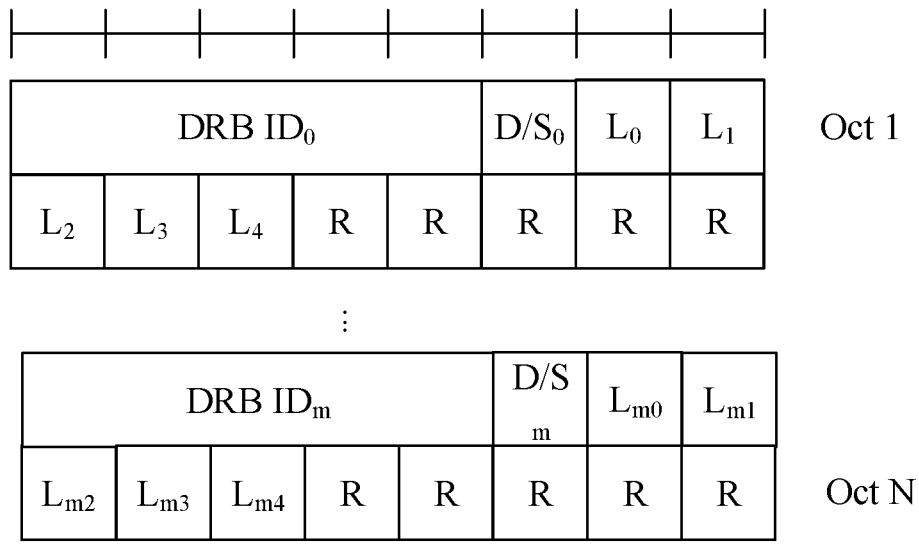
FIG. 6b is a schematic diagram 2 of a MAC CE according to some embodiments of this disclosure.
Figure 6C:
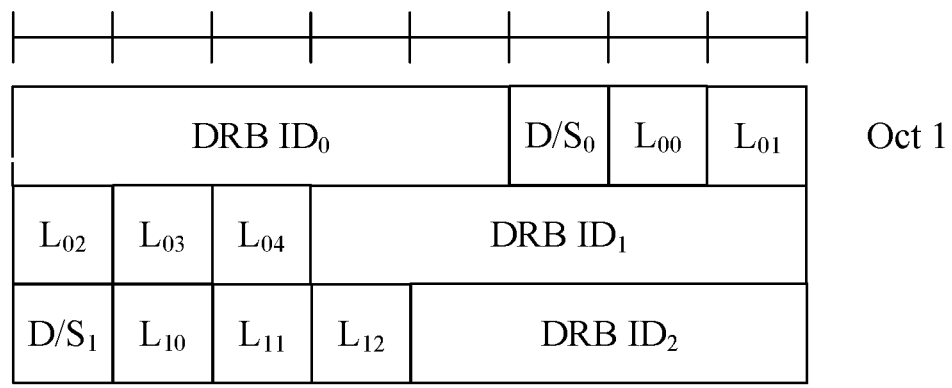
FIG. 6c is a schematic diagram 3 of a MAC CE according to some embodiments of this disclosure.
Figure 6C:
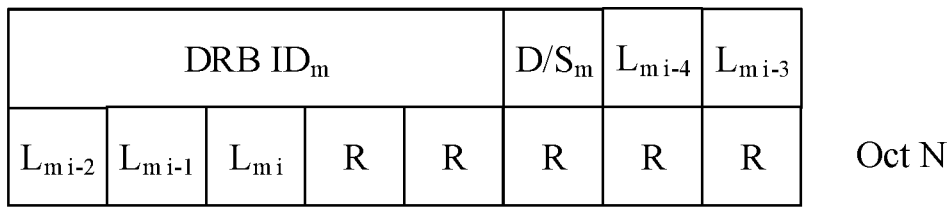

As shown in FIG. 5, the MAC CE subheader may include an R field, an F field, an LCID field, and an L field.

The R field is a reserved bit. As shown in FIG. 5, the R field may be set in the 1$^{st}$ bit of Oct (octet) 1.

The F field is used to indicate a length of the L field in units of octets. For example, if a value of the F field is "0", it indicates that the length of the L field is one octet; or if a value of the F field is "1", it indicates that the length of the L field is two octets. As shown in FIG. 5, the F field may be set in a second bit of Oct 1.

The LCID field is used to indicate a type of MAC CE signaling corresponding to the subheader, such as MAC CE signaling for activating or deactivating the data duplication function. A value of the LCID field may be an LCID value used to indicate a type of the first MAC CE signaling in the first MAC CE, or may be a newly introduced LCID value, and can be specifically determined according to actual needs. This is not limited in some embodiments of this disclosure. As shown in FIG. 5, the LCID field may be set in the last six octets of Oct 1.

The L field is used to indicate a length of a variable-length MAC CE. As shown in FIG. 5, the L field may be set in Oct 2 and Oct 3.

As shown in FIG. 6a, a body of the MAC CE includes a Dn field, a serving cell group identifier (Serving cell group ID) field, and an LCID field.

The Dn field is used to identify whether a split bearer whose sequence number is n is in the data duplication function operation mode or the split bearer operation mode. The Dn field may be equivalent to the split bearer indicator field. For example, if a value of the Dn field is "0", it may indicate that the split bearer is in the data duplication function mode; or if a value of the Dn field is "0", it may indicate that the split bearer needs to be switched to the split bearer operation mode.

The Dn field may be arranged in ascending order according to DRB (data radio bearer) identifiers of split bearers for which the data duplication function is configured.

It should be noted that the split bearer identified by the Dn field needs to satisfy that the split bearer has a corresponding RLC entity that belongs to a cell group in which a MAC entity receiving the MAC CE signaling is located. In some embodiments of this disclosure, the third MAC CE signaling may be used to instruct to activate or deactivate a transmission path of the target split bearer, which means that an RLC entity corresponding to the target split bearer includes a first RLC entity and that the first RLC entity and the MAC entity receiving the third MAC CE signaling are in a same cell group.

The serving cell group identifier (Serving cell group ID) field may be used to identify the cell group identifier, and the LCID field may be used to identify the logical channel identity. It should be understood that the serving cell group ID field and/or the LCID field can uniquely identify one transmission path.

In specific implementation, when the data duplication function of the target split bearer is activated, if the third MAC CE signaling carries a field identifying a transmission path associated with the target split bearer, the transmission path identified by the field in the target split bearer can be activated. Otherwise, the transmission path is deactivated by default. When the data duplication function of the target split bearer is deactivated, that is, when the target split bearer is in the split bearer operation mode, if the third MAC CE signaling carries a field identifying a transmission path associated with the target split bearer, it indicates that the transmission path identified by the field in the target split bearer is an available transmission path. Otherwise, the transmission path is an unavailable transmission path.

As shown in FIG. 6b and FIG. 6c, the body of the MAC CE includes a D/Sm field, a DRB IDm field, an Lmi field, and an R field.

The R field is a reserved bit.

The D/Sm field may be used to identify whether a split bearer whose sequence number is m is in the data duplication function operation mode or the split bearer operation mode. The D/Sm field may be equivalent to the split bearer indicator field. For example, if a value of the D/Sm field is "0", it indicates that the split bearer whose sequence number is m is in the data duplication function operation mode, that is, the data duplication function is activated; or if a value of the D/Sm field is "1", it indicates that the split bearer whose sequence number is m is in the split bearer operation mode, that is, the data duplication function is deactivated.

The DRB IDm field may be used to identify the split bearer for which the data duplication function is configured. The DRB IDm field may be equivalent to the first field.

Lmi indicates whether a transmission path that is associated with the radio bearer having the DRB IDm and whose sequence number is i is activated. This field may be equivalent to the second field. For example, if a value of Lmi is "1", it indicates that the transmission path whose sequence number is i is activated; or if a value of Lmi is "0", it indicates that the transmission path whose sequence number is i is deactivated.

A numbering rule for transmission paths associated with the target split bearer is as follows: For transmission paths in different cell groups, they can be numbered in ascending order of cell group identifiers; and for transmission paths in a same cell group, they can be numbered in ascending order of LCIDs corresponding to the transmission paths.

It should be noted that in an actual application, a format of the third MAC CE signaling may be represented in FIG. 5 and FIG. 6a, or represented in FIG. 5 and FIG. 6b, or FIG. 5 and FIG. 6c. However, it should be understood that the formats in FIG. 5, FIG. 6a, FIG. 6b, and FIG. 6c are only examples. Therefore, a specific representation form of the third MAC CE signaling is not limited in some embodiments of this disclosure.

In addition, because the third MAC signaling may actually be understood as the second MAC CE signaling including the split bearer indicator field, for a specific format of the second MAC CE signaling in the manner 3, refer to the format of the third MAC CE signaling. Details are not described again herein.

Manner 5: Dedicated split bearer indication signaling that carries threshold indication information, where in a case in which the data duplication function of the target split bearer is activated, the dedicated split bearer indication signaling is used to instruct the terminal to deactivate the data duplication function and determine, based on the threshold indication information, a split bearer threshold enabled for the target split bearer.

In some embodiments of this disclosure, the dedicated split bearer indication signaling may be MAC CE signaling or PDCP signaling or the like.

In a case in which the dedicated split bearer indication signaling is the MAC CE signaling, the dedicated split bearer indication signaling may further include identification information, and the identification information is used to identify the target split bearer.

As can be known from the examples described in the manner 4, in the case in which the dedicated split bearer indication signaling is MAC CE signaling, the dedicated split bearer indication signaling includes a MAC CE subheader and a MAC CE. For the MAC CE subheader, refer to FIG. 5. For the MAC CE, refer to FIG. 7a or FIG. 7b. Certainly, composition of the MAC CE is not limited to the two manners.

Figure 7A:
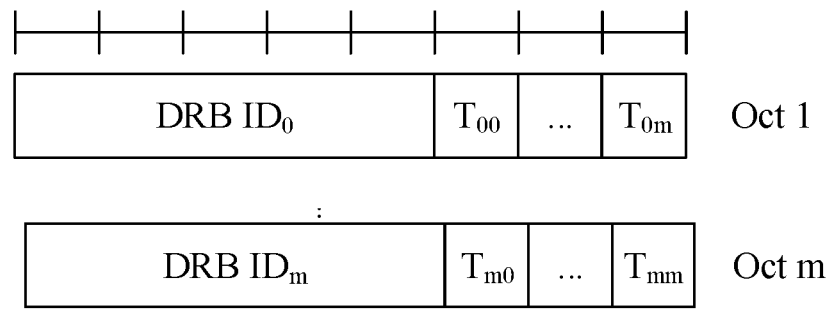
FIG. 7a is a schematic diagram 4 of a MAC CE according to some embodiments of this disclosure.

As shown in FIG. 7a, in the MAC CE of the dedicated split bearer indication signaling, a data radio bearer (Data RB, DRB) $ID_m$ field indicates the split bearer identifier, that is, the identification information, where m is a positive integer; and $T_{mn}$ indicates enabling or disabling of a split bearer threshold whose sequence number is n in the split bearer corresponding to the split bearer identifier in the DRB $ID_m$, where n is a positive integer, and if a value of $T_{mn}$ is "0", it is used to indicate that the split bearer threshold is not enabled, or if a value of $T_{mn}$ is "1", it is used to indicate that the split bearer threshold is enabled.

As can be seen, specifically, the threshold indication information may be third indication information, where the third indication information is used to indicate enabling or disabling of each split bearer threshold of the target split bearer, that is, the third indication information includes $T_{m0}$ to $T_{mn}$ shown in FIG. 7a.

It should be noted that the split bearer thresholds of the target split bearer are different. Therefore, the split bearer thresholds of the split bearer may be arranged in order. For example, the split bearer thresholds of the split bearer are arranged in ascending order.

Therefore, the split bearer thresholds may be numbered according to the arrangement of the split bearer thresholds. For example, in a case in which the split bearer thresholds of the split bearer are arranged in ascending order, the split bearer thresholds are numbered in ascending order of the split bearer thresholds, that is, in the split bearer corresponding to the split bearer identifier in the DRB $ID_m$, a split bearer threshold corresponding to $T_{m0}$ is the smallest, and a split bearer threshold corresponding to $T_{mn}$ is the largest.

Figure 7B:
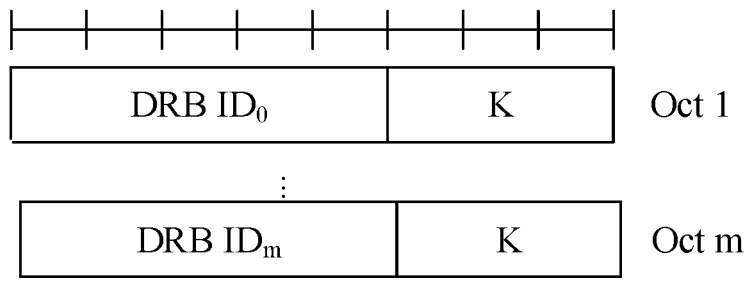
FIG. 7b is a schematic diagram 5 of a MAC CE according to some embodiments of this disclosure.

In the MAC CE of the dedicated split bearer indication signaling shown in FIG. 7b, a DRB IDm field indicates the split bearer identifier, that is, the identification information; and a K field indicates a quantity of split bearer thresholds enabled in the split bearer corresponding to the split bearer identifier in the DRB $ID_m$. For example, "001" indicates one split bearer threshold, and "010" indicates two split bearer thresholds.

As can be seen, in some embodiments of this disclosure, the threshold indication information may be fourth indication information, where the fourth indication information is used to indicate that H split bearer thresholds are enabled, where H is a positive integer less than or equal to N, that is, H is a quantity of enabled split bearer thresholds that is indicated in the K field.

Because the split bearer thresholds of the target split bearer may be arranged in order to form an arrangement, the enabled split bearer thresholds may be selected from the arrangement according to a preset rule. For example, when the K field indicates that the quantity of enabled split bearer thresholds is 2, that is, when H=2, the terminal may enable two split bearer thresholds in the middle of the arrangement according to the preset rule.

Specifically, the H split bearer thresholds are:
first H split bearer thresholds among the split bearer thresholds of the target split bearer that are arranged in ascending order; or
last H split bearer thresholds among the split bearer thresholds of the target split bearer that are arranged in descending order.

Herein, by preferentially enabling H smallest split bearer thresholds among the split bearer thresholds of the target split bearer, resource utilization of the terminal can be further improved.

Figure 8:
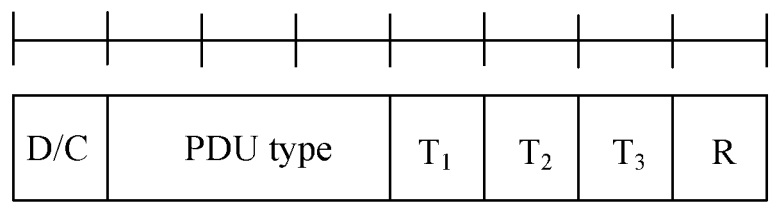
FIG. 8 is a schematic diagram of PDCP signaling according to some embodiments of this disclosure.

In addition, in a case in which the dedicated split bearer indication signaling is PDCP signaling, the PDCP signaling is a PDCP control protocol data unit (PDU) sent by the network-side device to the terminal, and a format of the PDCP signaling is shown in FIG. 8, where a D/C field is used to indicate that the PDU is a data PDU or a control PDU; a PDU type field is used to indicate a function type of the PDCP signaling, for example, the PDCP signaling is PDCP signaling for feeding back a compression status, PDCP signaling for feeding back a receiving status, or split bearer pdcp signaling; a $t_i$ field is used to indicate whether the $i^{th}$ threshold is enabled or disabled, for example, a $T_1$ field is used to indicate whether the $1^{st}$ threshold is enabled or disabled; and an R field is a reserved bit.

It should be noted that the split bearer indication signaling in some embodiments of this disclosure may be at least one of the foregoing signaling, and certainly may also be other signaling than the foregoing signaling. This is not limited herein.

As can be seen, the forgoing various split bearer indication signaling allows the terminal to activate or deactivate the data duplication function of the target split bearer in response to the split bearer indication signaling, and the implementations are diversified and flexible.

In summary, in a specific embodiment of this disclosure, the split bearer indication signaling may include the RRC signaling, and the RRC signaling is used to instruct the terminal to activate or deactivate the data duplication function.

Alternatively, the split bearer indication signaling may include the first media access control control element MAC CE signaling, and the first MAC CE signaling is used to instruct the terminal to activate or deactivate the data duplication function.

Alternatively, the split bearer indication signaling may include the second MAC CE signaling that carries the first indication information, and the first indication information is used to indicate activation or deactivation of the N transmission paths; and
the foregoing step 402 includes:
after the terminal executes the second MAC CE signaling, if all the N transmission paths are deactivated or one of the N transmission paths is activated, deactivating the data duplication function.

Alternatively, the split bearer indication signaling may include the third MAC CE signaling that carries the second indication information, and the second indication information is used to instruct the terminal to activate or deactivate the data duplication function.

Alternatively, the split bearer indication signaling may include the dedicated split bearer indication signaling that carries the threshold indication information, and in the case in which the data duplication function is activated, the dedicated split bearer indication signaling is used to instruct the terminal to deactivate the data duplication function and determine, based on the threshold indication information, the split bearer threshold enabled for the target split bearer.

To make the configuration of the split bearer indication signaling more flexible, in a more specific embodiment of this disclosure, in the case in which the split bearer indication signaling is the dedicated split bearer indication signaling, the dedicated split bearer indication signaling may be the MAC CE signaling or the PDCP signaling.

In the case in which the dedicated split bearer indication signaling is the MAC CE signaling, the dedicated split bearer indication signaling may further include the identification information, and the identification information is used to identify the target split bearer, so that the terminal can accurately control activation or deactivation of the data duplication function for different split bearers.

In addition, in a more specific embodiment of this disclosure, in the case in which the split bearer indication signaling is the dedicated split bearer indication signaling, the threshold indication information may be the third indication information, and the third indication information is used to indicate enabling or disabling of each split bearer threshold of the target split bearer, to make the threshold indication information more intuitive and increase a response speed of the terminal.

Alternatively, the threshold indication information may be the fourth indication information, and the fourth indication information is used to indicate that a preset quantity of split bearer thresholds are enabled, where the preset quantity of split bearer thresholds are top split bearer thresholds in the split bearer threshold arrangement, and the split bearer threshold arrangement is formed by arranging the split bearer thresholds of the target split bearer in order.

In some embodiments of this disclosure, in the foregoing step 402, the terminal may deactivate the data duplication function in the case in which the data duplication function of the target split bearer is activated, that is, the target split bearer falls back from the data duplication function operation mode to the split bearer operation mode; but in a case in which the data duplication function of the target split bearer is deactivated, that is, in a case in which the target split bearer is in the split bearer operation mode, the terminal activates the data duplication function, that is, the target split bearer is switched from the split bearer operation mode to the data duplication function operation mode.

After the terminal deactivates the data duplication function, that is, after the terminal falls back to the split bearer operation mode, the terminal can perform uplink data transmission through one transmission path in the target split bearer. For example, the terminal can perform uplink data transmission through a pre-designated transmission path in the target split bearer.

Optionally, after the terminal deactivates the data duplication function, the method further includes: determining, based on the split bearer thresholds of the target split bearer and the association relationships between the split bearer thresholds and the transmission paths, a transmission path for transmitting uplink transmission data among the N transmission paths.

Herein, the terminal may determine, based on the split bearer thresholds of the target split bearer and the association relationships between the split bearer thresholds and the transmission paths, the transmission path for transmitting uplink transmission data. Therefore, a manner of determining a transmission path for transmitting uplink transmission data is more flexible, and a possibility of always selecting a same transmission path for uplink data transmission is reduced, thereby further improving resource utilization of the terminal.

In a specific embodiment of this disclosure, the determining, based on the split bearer thresholds of the target split bearer and the association relationships between the split bearer thresholds and the transmission paths, the transmission path for transmitting uplink transmission data may include:
calculating an available uplink data volume (Available Data Volume);
comparing the available uplink data volume with at least one of the split bearer thresholds of the target split bearer, and determining a set of available transmission paths among the N transmission paths based on a comparison result; and
determining, in the set of available transmission paths, the transmission path for transmitting uplink transmission data.

Specifically, the available uplink data volume may include at least one of the following:
an available data volume in a packet data convergence protocol PDCP entity corresponding to the split bearer; or,
an available data volume in N RLC entities associated with the N transmission paths.

For example, in a case in which the foregoing split bearer is a split bearer shown in FIG. 3, the available data volume may be: the terminal calculates the data volume in the PDCP entity corresponding to the split bearer, or calculates a sum of an available data volume in the PDCP entity corresponding to the split bearer and an available data volume in five RLC entities.

It should be noted that the split bearer threshold used to determine the transmission path for transmitting uplink transmission data is a split bearer threshold enabled for the target split bearer in the configuration information in the case in which the data duplication function of the target split bearer is deactivated, that is, the target split bearer falls back to the split bearer operation mode.

In the case in which the target split bearer indication signaling is any one of the RRC signaling, the first MAC CE signaling, the second MAC CE signaling, or the third MAC CE signaling, the terminal does not perform an enabling or disabling operation on the split bearer threshold in the configuration information of the target split bearer. Therefore, the split bearer threshold of the target split bearer may be a split bearer threshold that is enabled before the terminal receives the split bearer indication signaling.

However, in the case in which the split bearer indication signaling is the dedicated split bearer indication signaling, the terminal receives the split bearer indication signaling, controls the target split bearer to fall back to the split bearer operation mode, and enables or disables the split bearer threshold in the configuration information. Therefore, the split bearer threshold of the target split bearer is the enabled split bearer threshold in the configuration information after the terminal enables or disables the split bearer threshold.

For example, the configuration information of the target split bearer includes a threshold 1, a threshold 2, and a threshold 3 arranged in ascending order. In a case in which the dedicated split bearer indication signaling is the MAC CE signaling and N=2 in the L field corresponding to the split bearer in the MAC CE of the split bearer indication signaling, the split bearer thresholds of the target split bearer are the threshold 1 and the threshold 2.

In addition, a quantity of the split bearer thresholds of the target split bearer may be one or more, and is not limited herein.

Specifically, when the split bearer threshold of the target split bearer is only one split bearer threshold, the terminal compares the amount of uplink data to be transmitted with the split bearer threshold, and determines the set of available transmission paths among the N transmission paths based on a comparison result. Specifically, this may include:
in a case in which the amount of uplink data to be transmitted is less than the split bearer threshold, determining that the set of available transmission paths is a transmission path associated with the split bearer threshold; or
in a case in which the amount of uplink data to be transmitted is greater than or equal to the split bearer threshold, determining that the set of available transmission paths is the N transmission paths.

In a case in which the split bearer thresholds of the target split bearer are M split bearer thresholds, and M is a positive integer greater than 1 and less than N, the comparing the amount of uplink data to be transmitted with at least one of the split bearer thresholds of the target split bearer, and determining a set of available transmission paths among the N transmission paths based on a comparison result may include:
in a case in which the amount of uplink data to be transmitted is less than a first split bearer threshold, determining that the set of available transmission paths is a transmission path associated with the first split bearer threshold, where the first split bearer threshold is a smallest split bearer threshold among the M split bearer thresholds;

in a case in which the amount of uplink data to be transmitted is greater than a second split bearer threshold, determining that the set of available transmission paths is the N transmission paths, where the second split bearer threshold is a largest split bearer threshold among the M split bearer thresholds; or in a case in which the amount of uplink data to be transmitted is greater than the $k^{th}$ split bearer threshold and less than or equal to the $(k+1)^{th}$ split bearer threshold, determining that the set of available transmission paths is a transmission path associated with the $(k+1)^{th}$ split bearer threshold, where the k split bearer threshold and the $(k+1)^{th}$ split bearer threshold are adjacent in the arrangement of the M split bearer thresholds, and k is any integer from 1 to (M−1).

Certainly, the determining a set of available transmission paths among the N transmission paths includes but is not limited to the foregoing several manners. Details are not described again herein.

It should be noted that in a case in which the split bearer indication signaling is the third MAC CE signaling that carries the second indication information, and the second indication information instructs the terminal to change the available transmission path among the N transmission paths, the determining a set of available transmission paths among the N transmission paths may be understood as determining the set of available transmission paths among available transmission paths among the N transmission paths.

For example, in a case in which the split bearer threshold of the target split bearer is one split bearer threshold, and the split bearer threshold is associated with a transmission path 1, a transmission path 2, and a transmission path 3, if the second indication information indicates that the transmission path 1 and the transmission path 2 are available but the transmission path 3 is unavailable, when the amount of uplink data to be transmitted is less than the split bearer threshold, the transmission path 1 and the transmission path 2 are determined as the set of available transmission paths.

In addition, the determining, in the set of available transmission paths, the transmission path for transmitting uplink transmission data may be randomly selecting one transmission path in the set of transmission paths as the transmission path for transmitting uplink transmission data; or may be determining, according to a rule prescribed by a protocol or configured, one transmission path in the set of available transmission paths as the transmission path for transmitting uplink transmission data, or the like. This is not limited herein.

In a specific embodiment of this disclosure, after the terminal activates the data duplication function, the method further includes:

performing the data duplication function based on an available transmission path of the target split bearer configured by the network-side device.

Herein, the terminal can perform the data duplication function based on the available transmission path of the target split bearer, thereby improving reliability of data.

It should be noted that in a case in which the split bearer indication signaling includes the third MAC CE signaling that carries the second indication information, and the second indication information is further used to instruct the terminal to change the available transmission path among the N transmission paths in a case in which the terminal activates the data duplication function, the available transmission path is an available transmission path among the N transmission paths after the terminal executes the third MAC CE signaling.

In some embodiments of this disclosure, the target split bearer is configured for the terminal, the data duplication function is configured for the target split bearer, the target split bearer includes the N transmission paths, and N is a positive integer greater than 2; the terminal receives the split bearer indication signaling sent by the network-side device; and the terminal activates or deactivates the data duplication function in response to the split bearer indication signaling. Because the N transmission paths may be configured for the split bearer of the terminal, a quantity of transmission paths of the split bearer increases, and reliability of the terminal is improved. In addition, the terminal can activate or deactivate the data duplication function of the target split bearer in time in response to the split bearer indication signaling, so that resource utilization of the terminal is improved.

Figure 9:
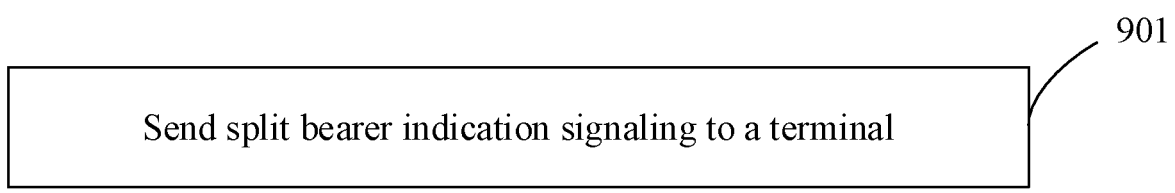
FIG. 9 is a flowchart 2 of a split bearer control method according to some embodiments of this disclosure.

FIG. 9 is a flowchart 2 of a split bearer control method according to some embodiments of this disclosure. The bearer control method in this embodiment may be applied to a network-side device. As shown in FIG. 9, the bearer control method in this embodiment may include the following step.

Step 901: Send split bearer indication signaling to a terminal, where the split bearer indication signaling is used to instruct the terminal to activate or deactivate a data duplication function in response to the split bearer indication signaling.

A target split bearer is configured for the terminal, the data duplication function is configured for the target split bearer, and the target split bearer includes N transmission paths.

Optionally, the split bearer indication signaling includes RRC signaling, and the RRC signaling is used to instruct the terminal to activate or deactivate the data duplication function.

Optionally, the split bearer indication signaling includes first MAC CE signaling, and the first MAC CE signaling is used to instruct the terminal to activate or deactivate the data duplication function.

Optionally, the split bearer indication signaling includes second MAC CE signaling that carries first indication information, and the first indication information is used to indicate activation or deactivation of the N transmission paths; and after the terminal executes the second MAC CE signaling, if all the N transmission paths are deactivated or one of the N transmission paths is activated, the terminal deactivates the data duplication function.

Optionally, the split bearer indication signaling includes third MAC CE signaling that carries second indication information, and the second indication information is used to instruct the terminal to activate or deactivate the data duplication function.

Optionally, in a case in which the terminal deactivates the data duplication function, the second indication information is further used to instruct the terminal to change an available transmission path among the N transmission paths.

Optionally, the split bearer indication signaling includes dedicated split bearer indication signaling that carries threshold indication information, and in a case in which the data duplication function is activated, the dedicated split bearer indication signaling is used to instruct the terminal to deactivate the data duplication function and determine, based on the threshold indication information, a split bearer threshold enabled for the target split bearer.

Optionally, the dedicated split bearer indication signaling is MAC CE signaling or PDCP signaling.

Optionally, in a case in which the dedicated split bearer indication signaling is the MAC CE signaling, the dedicated split bearer indication signaling further includes identification information, and the identification information is used to identify the target split bearer.

Optionally, the threshold indication information is third indication information, and the third indication information is used to indicate enabling or disabling of each split bearer threshold of the target split bearer.

Optionally, the threshold indication information is fourth indication information, and the fourth indication information is used to indicate that H split bearer thresholds are enabled, where H is a positive integer less than or equal to N.

Optionally, the H split bearer thresholds are:
first H split bearer thresholds among split bearer thresholds of the target split bearer that are arranged in ascending order; or
last H split bearer thresholds among split bearer thresholds of the target split bearer that are arranged in descending order.

It should be noted that this embodiment serves as an implementation of the network-side device corresponding to the foregoing method embodiment in FIG. 4. Therefore, reference can be made to the related description in the foregoing method embodiment, and the same beneficial effect can be achieved. To avoid repetition, details are not described again herein.

Figure 10:
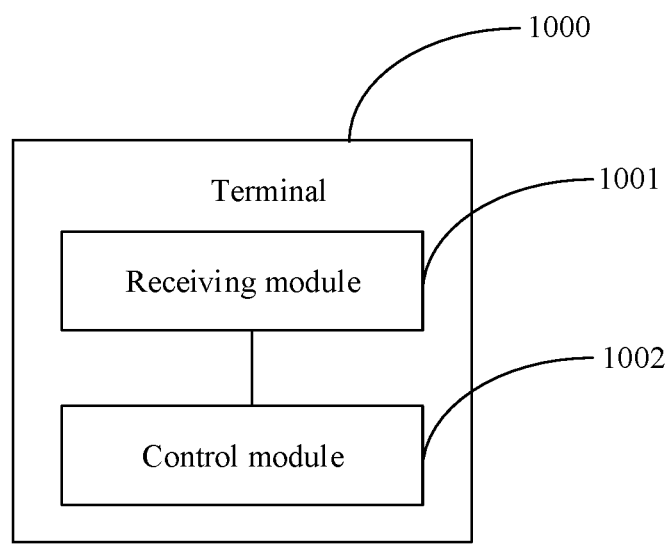
FIG. 10 is a structural diagram 1 of a terminal according to some embodiments of this disclosure.

FIG. 10 is a structural diagram 1 of a terminal according to some embodiments of this disclosure. A target split bearer is configured for the terminal, a data duplication function is configured for the target split bearer, the target split bearer includes N transmission paths, and N is a positive integer greater than 2. As shown in FIG. 10, the terminal 900 includes:
- a receiving module 1001, configured to receive split bearer indication signaling sent by a network-side device; and
- a control module 1002, configured to activate or deactivate the data duplication function in response to the split bearer indication signaling.

Optionally, the split bearer indication signaling includes RRC signaling, and the RRC signaling is used to instruct the terminal to activate or deactivate the data duplication function.

Optionally, the split bearer indication signaling includes first MAC CE signaling, and the first MAC CE signaling is used to instruct the terminal to activate or deactivate the data duplication function.

Optionally, the split bearer indication signaling includes second MAC CE signaling that carries first indication information, and the first indication information is used to indicate activation or deactivation of the N transmission paths; and
the control module 1002 is specifically configured to:
after the terminal executes the second MAC CE signaling, if all the N transmission paths are deactivated or one of the N transmission paths is activated, deactivate the data duplication function.

Optionally, the split bearer indication signaling includes third MAC CE signaling that carries second indication information, and the second indication information is used to instruct the terminal to activate or deactivate the data duplication function.

Optionally, in a case in which the terminal deactivates the data duplication function, the second indication information is further used to instruct the terminal to change an available transmission path among the N transmission paths.

Optionally, the split bearer indication signaling includes dedicated split bearer indication signaling that carries threshold indication information, and in a case in which the data duplication function is activated, the dedicated split bearer indication signaling is used to instruct the terminal to deactivate the data duplication function and determine, based on the threshold indication information, a split bearer threshold enabled for the target split bearer.

Optionally, the dedicated split bearer indication signaling is MAC CE signaling or PDCP signaling.

Optionally, in a case in which the dedicated split bearer indication signaling is the MAC CE signaling, the dedicated split bearer indication signaling further includes identification information, and the identification information is used to identify the target split bearer.

Optionally, the threshold indication information is third indication information, and the third indication information is used to indicate enabling or disabling of each split bearer threshold of the target split bearer.

Optionally, the threshold indication information is fourth indication information, and the fourth indication information is used to indicate that H split bearer thresholds are enabled, where H is a positive integer less than or equal to N.

Optionally, the H split bearer thresholds are:
first H split bearer thresholds among split bearer thresholds of the target split bearer that are arranged in ascending order; or
last H split bearer thresholds among split bearer thresholds of the target split bearer that are arranged in descending order.

Optionally, the terminal 1000 further includes:
a determining module, configured to determine, based on split bearer thresholds of the target split bearer and association relationships between the split bearer thresholds and transmission paths, a transmission path for transmitting uplink transmission data among the N transmission paths.

Optionally, the terminal 1000 further includes:
a transmission module, configured to perform the data duplication function based on an available transmission path of the target split bearer configured by the network-side device.

The terminal 1000 can implement each process of the method embodiment corresponding to FIG. 4 of this disclosure, with the same beneficial effect achieved. To avoid repetition, details are not described again herein.

Figure 11:
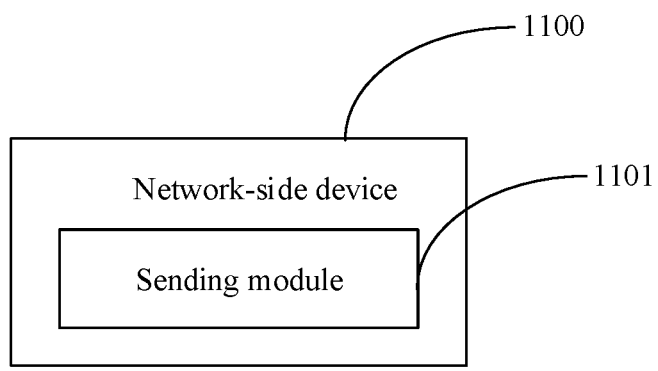
FIG. 11 is a structural diagram 1 of a network-side device according to some embodiments of this disclosure.

FIG. 11 is a structural diagram 1 of a network-side device according to some embodiments of this disclosure. As shown in FIG. 11, the network-side device 1100 includes:
a sending module 1101, configured to send split bearer indication signaling to a terminal, where the split bearer indication signaling is used to instruct the terminal to activate or deactivate a data duplication function in response to the split bearer indication signaling, where a target split bearer is configured for the terminal, the data duplication function is configured for the target split bearer, and the target split bearer includes N transmission paths.

Optionally, the split bearer indication signaling includes RRC signaling, and the RRC signaling is used to instruct the terminal to activate or deactivate the data duplication function.

Optionally, the split bearer indication signaling includes first MAC CE signaling, and the first MAC CE signaling is used to instruct the terminal to activate or deactivate the data duplication function.

Optionally, the split bearer indication signaling includes second MAC CE signaling that carries first indication information, and the first indication information is used to indicate activation or deactivation of the N transmission paths; and
 after the terminal executes the second MAC CE signaling, if all the N transmission paths are deactivated or one of the N transmission paths is activated, the terminal deactivates the data duplication function.

Optionally, the split bearer indication signaling includes third MAC CE signaling that carries second indication information, and the second indication information is used to instruct the terminal to activate or deactivate the data duplication function.

Optionally, in a case in which the terminal deactivates the data duplication function, the second indication information is further used to instruct the terminal to change an available transmission path among the N transmission paths.

Optionally, the split bearer indication signaling includes dedicated split bearer indication signaling that carries threshold indication information, and in a case in which the data duplication function is activated, the dedicated split bearer indication signaling is used to instruct the terminal to deactivate the data duplication function and determine, based on the threshold indication information, a split bearer threshold enabled for the target split bearer.

Optionally, the dedicated split bearer indication signaling is MAC CE signaling or PDCP signaling.

Optionally, in a case in which the dedicated split bearer indication signaling is the MAC CE signaling, the dedicated split bearer indication signaling further includes identification information, and the identification information is used to identify the target split bearer.

Optionally, the threshold indication information is third indication information, and the third indication information is used to indicate enabling or disabling of each split bearer threshold of the target split bearer.

Optionally, the threshold indication information is fourth indication information, and the fourth indication information is used to indicate that H split bearer thresholds are enabled, where H is a positive integer less than or equal to N.
 Optionally, the H split bearer thresholds are:
 first H split bearer thresholds among split bearer thresholds of the target split bearer that are arranged in ascending order; or
 last H split bearer thresholds among split bearer thresholds of the target split bearer that are arranged in descending order.

The network-side device 1100 can implement each process of the method embodiment in FIG. 9 of this disclosure, with the same beneficial effect achieved. To avoid repetition, details are not described again herein.

Figure 12:
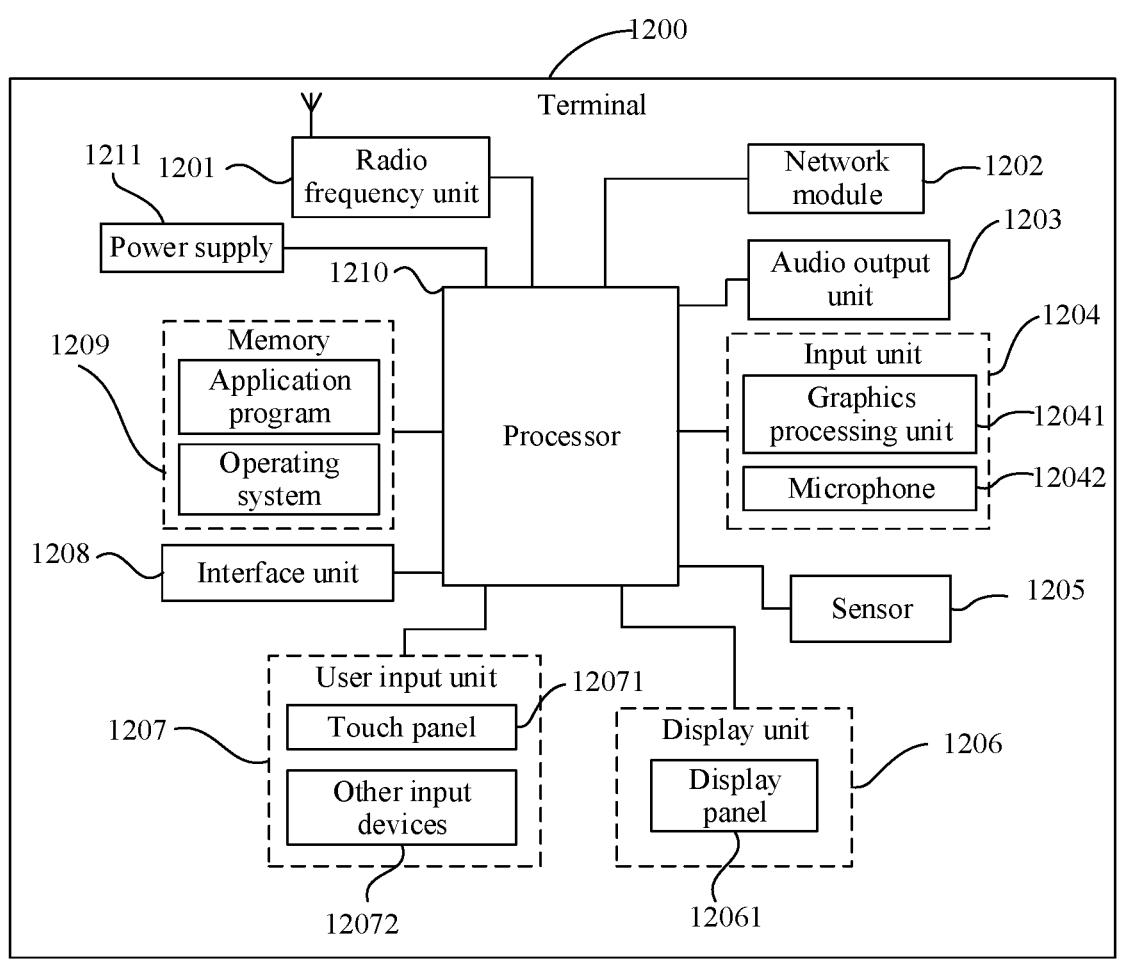
FIG. 12 is a structural diagram 2 of a terminal according to some embodiments of this disclosure.

Refer to FIG. 12, FIG. 12 is a structural diagram 2 of a terminal according to some embodiments of this disclosure. The terminal may have a hardware structure for implementing various embodiments of this disclosure. As shown in the figure, the terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that the structure of the terminal shown in the figure does not constitute a limitation on the terminal. A quantity of components included in the terminal may be greater or less than that shown in the figure, or some components are combined, or component arrangements are different. A split bearer is configured for the terminal 1200, a data duplication function is configured for the target split bearer, and the target split bearer includes N transmission paths. In some embodiments of this disclosure, the terminal includes but is not limited to a mobile phone, a tablet computer, a laptop computer, a palmtop computer, an in-vehicle terminal, a wearable device, a pedometer, and the like.

The radio frequency unit 1201 is configured to:
 receive split bearer indication signaling sent by a network-side device; and
 the processor 1210 is configured to:
 activate or deactivate the data duplication function in response to the split bearer indication signaling.

Optionally, the split bearer indication signaling includes radio resource control RRC signaling, and the RRC signaling is used to instruct the terminal to activate or deactivate the data duplication function.

Optionally, the split bearer indication signaling includes first MAC CE signaling, and the first MAC CE signaling is used to instruct the terminal to activate or deactivate the data duplication function.

Optionally, the split bearer indication signaling includes second MAC CE signaling that carries first indication information, and the first indication information is used to indicate activation or deactivation of the N transmission paths; and
 the processor 1210 is configured to:
 after the terminal executes the second MAC CE signaling, if all the N transmission paths are deactivated or one of the N transmission paths is activated, deactivate the data duplication function.

Optionally, the split bearer indication signaling includes third MAC CE signaling that carries second indication information, and the second indication information is used to instruct the terminal to activate or deactivate the data duplication function.

Optionally, in a case in which the terminal deactivates the data duplication function, the second indication information is further used to instruct the terminal to change an available transmission path among the N transmission paths.

Optionally, the split bearer indication signaling includes dedicated split bearer indication signaling that carries threshold indication information, and in a case in which the data duplication function is activated, the dedicated split bearer indication signaling is used to instruct the terminal to deactivate the data duplication function and determine, based on the threshold indication information, a split bearer threshold enabled for the target split bearer.

Optionally, the dedicated split bearer indication signaling is MAC CE signaling or PDCP signaling.

Optionally, in a case in which the dedicated split bearer indication signaling is the MAC CE signaling, the dedicated split bearer indication signaling further includes identification information, and the identification information is used to identify the target split bearer.

Optionally, the threshold indication information is third indication information, and the third indication information is used to indicate enabling or disabling of each split bearer threshold of the target split bearer.

Optionally, the threshold indication information is fourth indication information, and the fourth indication information is used to indicate that H split bearer thresholds are enabled, where H is a positive integer less than or equal to N.

Optionally, the H split bearer thresholds are:
first H split bearer thresholds among split bearer thresholds of the target split bearer that are arranged in ascending order; or
last H split bearer thresholds among split bearer thresholds of the target split bearer that are arranged in descending order.

Optionally, the processor 1210 is further configured to:
determine, based on split bearer thresholds of the target split bearer and association relationships between the split bearer thresholds and transmission paths, a transmission path for transmitting uplink transmission data among the N transmission paths.

Optionally, the processor 1210 is further configured to:
perform the data duplication function based on an available transmission path of the target split bearer configured by the network-side device.

It should be noted that the terminal 1200 in this embodiment can implement each process of the method embodiment corresponding to FIG. 4 in some embodiments of this disclosure, with the same beneficial effect achieved. To avoid repetition, details are not described again herein.

It should be understood that in some embodiments of this disclosure, the radio frequency unit 1201 may be configured to: receive and send signals in an information receiving/sending process or a call process; and specifically, after receiving downlink data from a base station, send the downlink data to the processor 1210 for processing, and in addition, send uplink data to the base station. Generally, the radio frequency unit 1201 includes but is not limited to an antenna, at least one amplifier, a transceiver, a coupler, a low noise amplifier, a duplexer, and the like. In addition, the radio frequency unit 1201 may further communicate with a network and another device through a wireless communications system.

The terminal provides wireless broadband Internet access for a user by using the network module 1202, for example, helps the user send and receive e-mails, browse web pages, and access streaming media.

The audio output unit 1203 may convert audio data received by the radio frequency unit 1201 or the network module 1202 or stored in the memory 1209 into an audio signal, and output the audio signal as a sound. In addition, the audio output unit 1203 may further provide an audio output (for example, a call signal received sound or a message received sound) related to a specific function performed by the terminal 1200. The audio output unit 1203 includes a speaker, a buzzer, a telephone receiver, and the like.

The input unit 1204 is configured to receive an audio or video signal. The input unit 1204 may include a graphics processing unit (GPU) 12041 and a microphone 12042. The graphics processing unit 12041 processes image data of a still picture or a video obtained by an image capture apparatus (for example, a camera) in an image capture mode or a video capture mode. A processed image frame may be displayed on the display unit 1206. An image frame processed by the graphics processing unit 12041 may be stored in the memory 1209 (or another storage medium) or sent by the radio frequency unit 1201 or the network module 1202. The microphone 12042 can receive a sound and can process the sound into audio data. The processed audio data can be converted in a telephone call mode into a format that can be sent to a mobile communications base station through the radio frequency unit 1201, for outputting.

The terminal 1200 further includes at least one sensor 1205, for example, an optical sensor, a motion sensor, and another sensor. Specifically, the optical sensor includes an ambient light sensor and a proximity sensor. The ambient light sensor may adjust luminance of a display panel 12061 based on brightness of ambient light. The proximity sensor may turn off the display panel 12061 and/or backlight when the terminal 1200 moves to an ear. As a type of motion sensor, an accelerometer sensor can detect magnitudes of accelerations in all directions (usually three axes), can detect a magnitude and a direction of gravity when the mobile phone is in a stationary state, and can be applied to terminal posture recognition (such as screen switching between portrait and landscape, related games, and magnetometer posture calibration), functions related to vibration recognition (such as pedometer and tapping), and the like. The sensor 1205 may further include a fingerprint sensor, a pressure sensor, an iris sensor, a molecular sensor, a gyroscope, a barometer, a hygrometer, a thermometer, an infrared sensor, and the like. Details are not described herein.

The display unit 1206 is configured to display information input by the user or information provided for the user. The display unit 1206 may include the display panel 12061. The display panel 12061 may be configured in a form of a liquid crystal display (LCD), an organic light-emitting diode (OLED), or the like.

The user input unit 1207 may be configured to receive input digit or character information, and generate a key signal input related to a user setting and function control of the terminal. Specifically, the user input unit 1207 includes a touch panel 12071 and other input devices 12072. The touch panel 12071, also referred to as a touchscreen, may capture a touch operation performed by the user on or near the touch panel 12071 (for example, an operation performed by the user on the touch panel 12071 or near the touch panel 12071 by using any appropriate object or accessory such as a finger or a stylus). The touch panel 12071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 1210, and receives and executes a command sent by the processor 1210. In addition, the touch panel 12071 may be implemented in a plurality of forms, for example, a resistive, capacitive, infrared, or surface acoustic wave touch panel. The user input unit 1207 may further include the other input devices 12072 in addition to the touch panel 12071. Specifically, the other input devices 12072 may include but are not limited to a physical keyboard, a function key (such as a volume control key or a power on/off key), a trackball, a mouse, a joystick, and the like. Details are not described herein.

Further, the touch panel 12071 may cover the display panel 12061. After the touch panel 12071 detects a touch operation on or near the touch panel, the touch panel 12071 transmits the touch operation to the processor 1210 to determine a type of a touch event. Then the processor 1210 provides a corresponding visual output on the display panel 12061 based on the type of the touch event. Although the touch panel 12071 and the display panel 12061 are used as two independent components to implement input and output functions of the terminal in the figure, the touch panel 12071 and the display panel 12061 may be integrated to implement the input and output functions of the terminal in some embodiments. This is not specifically limited herein.

The interface unit 1208 is an interface for connecting an external apparatus to the terminal 1200. For example, the external apparatus may include a wired or wireless headphone port, an external power (or battery charger) port, a wired or wireless data port, a memory card port, a port for connecting an apparatus having an identification module, an audio input/output (I/O) port, a video IO port, an earphone port, and the like. The interface unit 1208 may be configured to receive an input (for example, data information or power) from an external apparatus, and transmit the received input to one or more components in the terminal 1200, or may be configured to transmit data between the terminal 1200 and an external apparatus.

The memory 1209 may be configured to store a software program and various data. The memory 1209 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1209 may include a high-speed random access memory, or may include a non-volatile memory, for example, at least one magnetic disk storage device, a flash memory, or other non-volatile solid-state storage devices.

The processor 1210 is a control center of the terminal. The processor 1210 uses various interfaces and lines to connect all parts of the entire terminal, and performs various functions and data processing of the terminal by running or executing the software program and/or module stored in the memory 1209 and invoking data stored in the memory 1209, thereby performing overall monitoring on the terminal. The processor 1210 may include one or more processing units. Optionally, the processor 1210 may integrate an application processor and a modem processor. The application processor mainly processes the operating system, a user interface, an application program, and the like. The modem processor mainly processes wireless communication. It may be understood that the modem processor may alternatively not be integrated into the processor 1210.

The terminal 1200 may further include the power supply 1211 (for example, a battery) supplying power to all components. Optionally, the power supply 1211 may be logically connected to the processor 1210 through a power management system. In this way, functions such as charge management, discharge management, and power consumption management are implemented by using the power management system.

In addition, the terminal 1200 includes some functional modules that are not illustrated. Details are not described herein.

Optionally, some embodiments of this disclosure further provide a terminal, including a processor 1210, a memory 1209, and a computer program stored in the memory 1209 and capable of running on the processor 1210. When the computer program is executed by the processor 1210, each process of the foregoing split bearer control method embodiment is implemented, with the same technical effect achieved. To avoid repetition, details are not described again herein.

Figure 13:
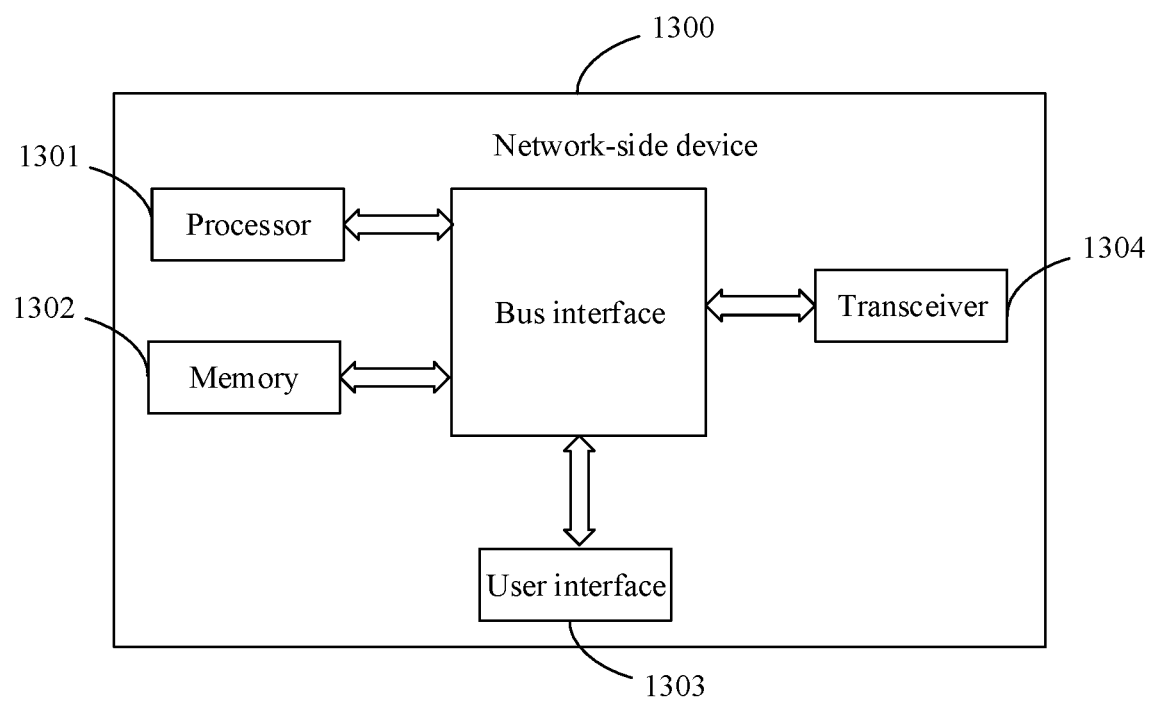
FIG. 13 is a structural diagram 2 of a network-side device according to some embodiments of this disclosure.

FIG. 13 is a structural diagram 2 of a network-side device according to some embodiments of this disclosure. As shown in FIG. 13, the network-side device 1300 includes a processor 1301, a memory 1302, a user interface 1303, a transceiver 1304, and a bus interface.

In some embodiments of this disclosure, the network-side device 1300 further includes a computer program stored in the memory 1302 and capable of running on the processor 1301. When the computer program is executed by the processor 1301, the following step is implemented:

sending split bearer indication signaling to a terminal, where the split bearer indication signaling is used to instruct the terminal to activate or deactivate a data duplication function in response to the split bearer indication signaling, where a target split bearer is configured for the terminal, the data duplication function is configured for the target split bearer, and the target split bearer includes N transmission paths.

Optionally, the split bearer indication signaling includes RRC signaling, and the RRC signaling is used to instruct the terminal to activate or deactivate the data duplication function.

Optionally, the split bearer indication signaling includes first MAC CE signaling, and the first MAC CE signaling is used to instruct the terminal to activate or deactivate the data duplication function.

Optionally, the split bearer indication signaling includes second MAC CE signaling that carries first indication information, and the first indication information is used to indicate activation or deactivation of the N transmission paths; and after the terminal executes the second MAC CE signaling, if all the N transmission paths are deactivated or one of the N transmission paths is activated, the terminal deactivates the data duplication function.

Optionally, the split bearer indication signaling includes third MAC CE signaling that carries second indication information, and the second indication information is used to instruct the terminal to activate or deactivate the data duplication function.

Optionally, in a case in which the terminal deactivates the data duplication function, the second indication information is further used to instruct the terminal to change an available transmission path among the N transmission paths.

Optionally, the split bearer indication signaling includes dedicated split bearer indication signaling that carries threshold indication information, and in a case in which the data duplication function is activated, the dedicated split bearer indication signaling is used to instruct the terminal to deactivate the data duplication function and determine, based on the threshold indication information, a split bearer threshold enabled for the target split bearer.

Optionally, the dedicated split bearer indication signaling is MAC CE signaling or PDCP signaling.

Optionally, in a case in which the dedicated split bearer indication signaling is the MAC CE signaling, the dedicated split bearer indication signaling further includes identification information, and the identification information is used to identify the target split bearer.

Optionally, the threshold indication information is third indication information, and the third indication information is used to indicate enabling or disabling of each split bearer threshold of the target split bearer.

Optionally, the threshold indication information is fourth indication information, and the fourth indication information is used to indicate that H split bearer thresholds are enabled, where H is a positive integer less than or equal to N.

Optionally, the H split bearer thresholds are:
first H split bearer thresholds among split bearer thresholds of the target split bearer that are arranged in ascending order; or
last H split bearer thresholds among split bearer thresholds of the target split bearer that are arranged in descending order.

In FIG. 13, a bus architecture may include any quantity of interconnect buses and bridges, specifically for interconnecting various circuits of one or more processors represented by the processor 1301 and a memory represented by the memory 1302. The bus architecture may further interconnect various other circuits such as a peripheral device, a voltage regulator, and a power management circuit. These are all well known in the art, and therefore are not further described in this specification. The bus interface provides an interface. The transceiver 1304 may be a plurality of components, that is, the transceiver 1304 includes a transmitter and a receiver, and provides a unit for communicating with various other apparatuses on a transmission medium. For different user equipment, the user interface 1303 may also be an interface for externally or internally connecting a required device, and the connected device includes but is not limited to a mini keyboard, a display, a speaker, a microphone, a joystick, or the like.

The processor 1301 is responsible for bus architecture management and general processing. The memory 1302 may store data used when the processor 1301 performs an operation.

The network-side device 1300 is capable of implementing each process implemented by the network-side device in the foregoing method embodiment in FIG. 9. To avoid repetition, details are not described again herein.

Some embodiments of this disclosure further provide a computer-readable storage medium, where the computer-readable storage medium stores a computer program. When the computer program is executed by a processor, processes of the foregoing split bearer control method embodiments in FIG. 4 and FIG. 9 are implemented, with the same technical effect achieved. To avoid repetition, details are not described again herein. The computer-readable storage medium is, for example, a read-only memory (ROM), a random access memory (RAM), a magnetic disk, or an optical disc.

It should be noted that the terms "comprising", "including", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A split bearer control method, applied to a terminal, wherein a target split bearer is configured for the terminal, a data duplication function is configured for the target split bearer, the target split bearer comprises N transmission paths, and N is a positive integer greater than 2; and the method comprises:
   receiving split bearer indication signaling sent by a network-side device; and
   activating or deactivating the data duplication function in response to the split bearer indication signaling;
   wherein the split bearer indication signaling comprises second MAC CE signaling that carries first indication information, and the first indication information is used to indicate activation or deactivation of the N transmission paths; and
   the activating or deactivating the data duplication function in response to the split bearer indication signaling comprises:
   after the terminal executes the second MAC CE signaling, if all the N transmission paths are deactivated or only one of the N transmission paths is activated, deactivating the data duplication function;
   wherein the second MAC CE signaling comprises: a first field used to identify the target split bearer, and a second field used to indicate the state of the transmission path whose sequence number is i in the target split bearer;
   wherein i is an integer greater than or equal to 0 and less than or equal to N.

2. The split bearer control method according to claim 1, wherein after the terminal deactivates the data duplication function, the method further comprises:
   determining, based on split bearer thresholds of the target split bearer and association relationships between the split bearer thresholds and transmission paths, a transmission path for transmitting uplink transmission data among the N transmission paths.

3. The split bearer control method according to claim 1, wherein configuration information of the target split bearer is configured in the terminal, the configuration information is sent by the network-side device to the terminal, and the configuration information comprises at least one of the following:
   a split bearer identifier;
   configuration information of N radio link control, RLC, entities associated with the split bearer, wherein the N RLC entities belong to different cell groups;
   at least one split bearer threshold; or,
   association relationships between split bearer thresholds and transmission paths.

4. The split bearer control method according to claim 3, wherein the association relationships between the split bearer thresholds and transmission paths comprise the following information:

each split bearer threshold corresponds to one or more transmission paths, wherein a quantity of transmission paths corresponding to each split bearer threshold is less than N.

5. The split bearer control method according to claim 1, wherein the second MAC CE signaling comprises a cell group identifier and a logical channel identity.

6. A split bearer control method, applied to a network-side device and comprising:
sending split bearer indication signaling to a terminal, wherein the split bearer indication signaling is used to instruct the terminal to activate or deactivate a data duplication function in response to the split bearer indication signaling, wherein
a target split bearer is configured for the terminal, the data duplication function is configured for the target split bearer, and the target split bearer comprises N transmission paths;
wherein the split bearer indication signaling comprises second MAC CE signaling that carries first indication information, and the first indication information is used to indicate activation or deactivation of the N transmission paths, wherein after the terminal executes the second MAC CE signaling, if all the N transmission paths are deactivated or only one of the N transmission paths is activated, the terminal deactivates the data duplication function;
wherein the second MAC CE signaling comprises: a first field used to identify the target split bearer, and a second field used to indicate the state of the transmission path whose sequence number is i in the target split bearer;
wherein i is an integer greater than or equal to 0 and less than or equal to N.

7. The split bearer control method according to claim 6, wherein configuration information of the target split bearer is configured in the terminal, the configuration information is sent by the network-side device to the terminal, and the configuration information comprises at least one of the following:
a split bearer identifier;
configuration information of N radio link control, RLC, entities associated with the split bearer, wherein the N RLC entities belong to different cell groups;
at least one split bearer threshold; or,
association relationships between split bearer thresholds and transmission paths.

8. The split bearer control method according to claim 7, wherein the association relationships between the split bearer thresholds and transmission paths comprise the following information:
each split bearer threshold corresponds to one or more transmission paths, wherein a quantity of transmission paths corresponding to each split bearer threshold is less than N.

9. A terminal, comprising a processor, a memory, and a computer program stored in the memory and capable of running on the processor, wherein when the computer program is executed by the processor, the following steps are implemented:
receiving split bearer indication signaling sent by a network-side device; and
activating or deactivating data duplication function in response to the split bearer indication signaling;
wherein the split bearer indication signaling comprises second MAC CE signaling that carries first indication information, and the first indication information is used to indicate activation or deactivation of the N transmission paths; and
the activating or deactivating the data duplication function in response to the split bearer indication signaling comprises:
after the terminal executes the second MAC CE signaling, if all the N transmission paths are deactivated or only one of the N transmission paths is activated, deactivating the data duplication function;
wherein the second MAC CE signaling comprises: a first field used to identify the target split bearer, and a second field used to indicate the state of the transmission path whose sequence number is i in the target split bearer;
wherein i is an integer greater than or equal to 0 and less than or equal to N.

10. The terminal according to claim 9, wherein after the terminal deactivates the data duplication function, the method further comprises:
determining, based on split bearer thresholds of the target split bearer and association relationships between the split bearer thresholds and transmission paths, a transmission path for transmitting uplink transmission data among the N transmission paths.

11. The terminal according to claim 9, wherein configuration information of the target split bearer is configured in the terminal, the configuration information is sent by the network-side device to the terminal, and the configuration information comprises at least one of the following:
a split bearer identifier;
configuration information of N radio link control, RLC, entities associated with the split bearer, wherein the N RLC entities belong to different cell groups;
at least one split bearer threshold; or,
association relationships between split bearer thresholds and transmission paths.

12. The terminal according to claim 11, wherein the association relationships between the split bearer thresholds and transmission paths comprise the following information:
each split bearer threshold corresponds to one or more transmission paths, wherein a quantity of transmission paths corresponding to each split bearer threshold is less than N.

13. The terminal according to claim 9, wherein the second MAC CE signaling comprises a cell group identifier and a logical channel identity.

14. A network-side device, comprising a processor, a memory, and a computer program stored in the memory and capable of running on the processor, wherein when the computer program is executed by the processor, the steps of the split bearer control method according to claim 6 are implemented.

* * * * *